United States Patent [19]

Fletcher et al.

[11] 4,053,231

[45] Oct. 11, 1977

[54] INTEROMETER MIRROR TILT CORRECTING SYSTEM

[76] Inventors: James C. Fletcher, Administrator of the National Aeronautics and Space Administration, with respect to an invention of; Rudolf A. Schindler, Sierra Madre, Calif.

[21] Appl. No.: 641,803

[22] Filed: Dec. 18, 1975

[51] Int. Cl.$^2$ ................................................ G01B 9/02
[52] U.S. Cl. .................................. 356/106 S; 356/110
[58] Field of Search ............... 356/106 R, 106 S, 110, 356/112; 324/83 R, 83 A

[56] References Cited

U.S. PATENT DOCUMENTS

| | | | |
|---|---|---|---|
| 3,253,223 | 5/1966 | Kettel | 324/83 A |
| 3,563,664 | 2/1971 | Campbell et al. | 356/106 R |
| 3,729,261 | 4/1973 | Sandercock | 356/112 |
| 3,796,494 | 3/1974 | Takabayashi | 356/106 R |

OTHER PUBLICATIONS

Ashley et al., "27.Fourier Spectroscopy Applied to Field Measurements" Special reports No. 114, Aspen International Conference on Fourier Spectroscopy; Jan. 5, 1971.

*Primary Examiner*—Conrad J. Clark
*Attorney, Agent, or Firm*—Monte F. Mott; Paul F. McCaul; John R. Manning

[57] ABSTRACT

An interferometer having servo means for automatically adjusting the angular tilt of a reflecting surface in one of two paths to maintain the exit beams from the two paths parallel to each other. Three detectors at the output of the interferometer are disposed on mutually perpendicular axes which define a plane normal to the nominal exit beam axis. One detector at the origin of the axes is used as a reference for separate phase-difference comparison with the outputs of the other two detectors on the X and Y axes to develop servo error signals.

7 Claims, 4 Drawing Figures

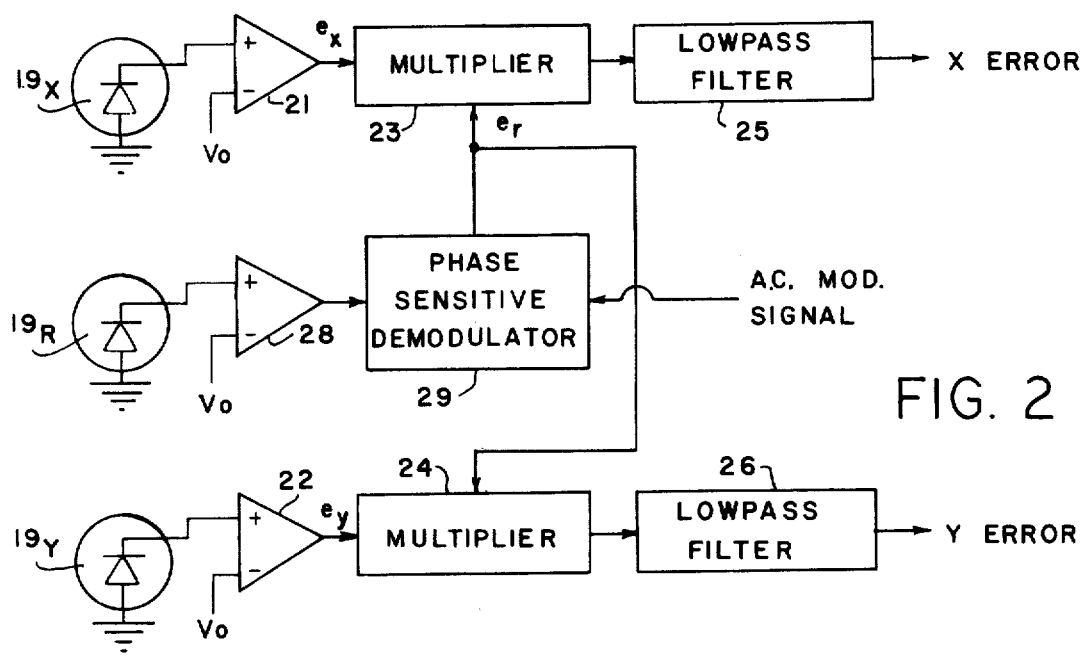
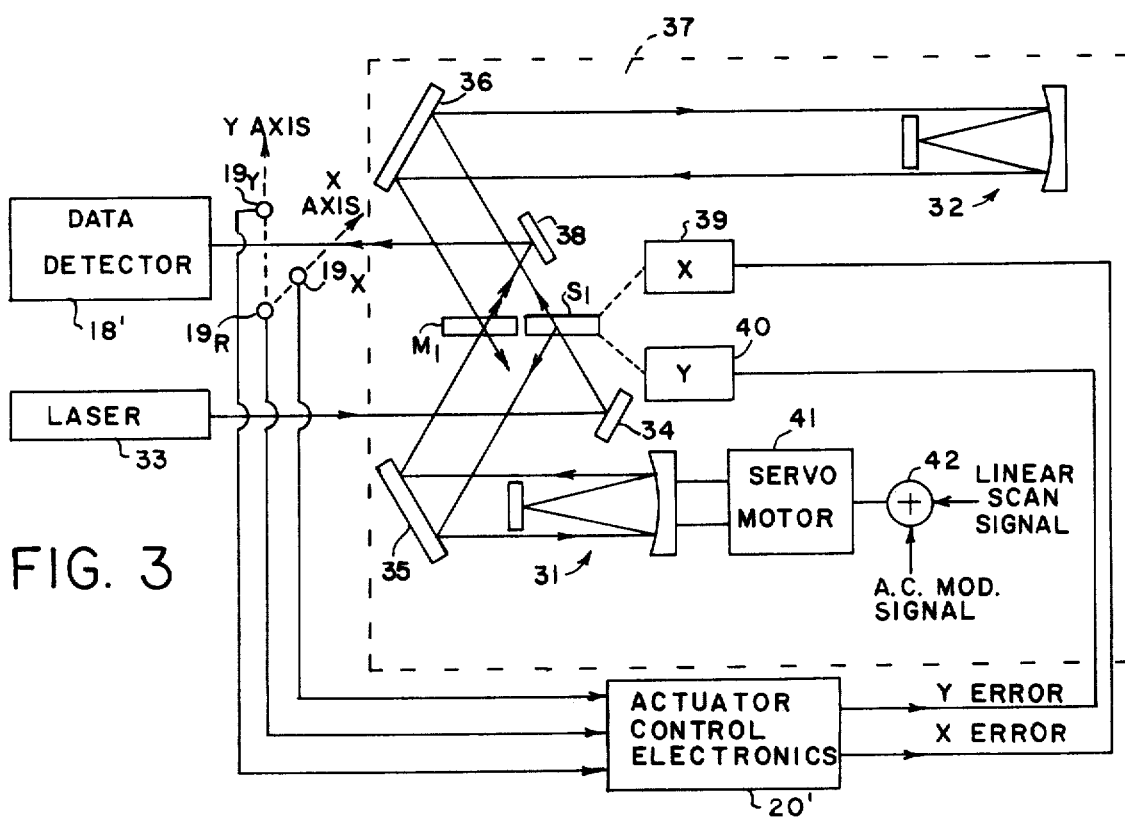
FIG. 2
FIG. 3

INTERFEROMETER MIRROR TILT CORRECTING SYSTEM

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to interferometers, and more particularly to the problem of maintaining the proper orientation of one path with respect to another.

Interferometers are coming into widespread use under such operating conditions that it is becoming increasingly difficult to maintain the precision required for the application. For example, a high-resolution Fourier interference spectrometer capable of operating in severe environments is sometimes required to provide continuous coverage of the wavelength interval of 2000 to 8000 cm$^{-1}$ with a resolution of 0.3cm$^{-1}$ for airborne meteorological measurements, and planetary observations from outside the earth's atmosphere. The heart of the instrument is the interferometer.

In a typical interference spectrometer, a moving reflecting element steps incrementally under control of a monochromatic reference source and remains stationary during a data-taking period. Although this step-method of scanning is somewhat more complex than constant-speed scanning, it eliminates errors due to driving speed fluctuations. That is an important consideration in a high-vibration environment, because the optical path difference between the two beams is known, and constant, at every instant of the data-taking period. The problem is maintaining the proper orientation of one reflecting surface with respect to another as the one reflecting surface is driven from one position to the other.

In a Michelson-type interferometer one plane mirror is fixed in position at a 45° angle with respect to a beam splitter, and the other plane mirror is oriented at a 90° angle with respect to the one mirror. As the second mirror is adjusted in position by a linear motion actuator to vary the difference in the length of the two paths, or arms, of the interferometer, the 90° orientation of the second mirror may deviate over the full travel of the linear motion actuator, particularly if that full length is of the order of several inches.

A corresponding problem arises in other types of interferometers such as those utilizing cat's-eye retroreflectors in place of plane mirrors. Light coming through either arm of the instrument is reflected by a small plane mirror on the axis of the cat's-eye reflector. Thus, a change is made in the optical path difference of four times the motion of the mirror relative to its cat's-eye reflector, instead of twice, as in the case of moving a mirror in a Michelson-type interferometer. It is possible to maintain the small retroreflector mirror fixed in position relative to its reflector, and to move the entire retroreflector with a linear motion actuator to change the optical path difference, but it is then a problem to maintain the axis of the moving retroreflector fixed in space. Tilting the axis of the retroreflector may have the same deleterious effect as tilting a plane mirror in a Michelson-type interferometer, depending upon the optical configuration of the instrument. Accordingly the purpose of the present invention is to provide for automatically correcting any angular tilt of the variable arm of an interferometer, and to automatically make a compensating adjustment in the optical configuration of the instrument.

SUMMARY OF THE INVENTION

These and other objects of the invention are achieved by a servo system for so automatically adjusting the angular tilt of a reflecting surface as to maintain the interfering beams of two paths, or arms, parallel to each other while one path length is varied in response to controlled actuating means. Three detectors near the output detector of the interferometer are disposed on mutually perpendicular axes which define a plane normal to the nominal exit beam axis. One detector is placed on the origin of the axis to receive light reflected from a reference point R on the aforesaid reflecting surface. One of the other detectors is placed on one axis to receive light reflected from a point X on the aforesaid reflecting surface. The third detector is placed on the other axis to receive light from a point Y on the aforesaid reflecting surface. These reflecting points are thus on X and Y axis. Actuating means responsive to an X error signal tilts the reflecting surface in the X axis while actuating means responsive to a Y error signal tilts the reflecting surface in the Y axis. Each of the detectors has sufficient area to receive light reflected from its associated point as the reflecting surface is tilted through some finite angular tilt angle of the X and Y axis. The light reflected from the point R and detected by said one detector is effectively spatially phase shifted 90°. The output of that detector, $e_r$, is used to multiply the output signals $e_x$ and $e_y$ of the other two detectors to produce the X and Y error signals for the aforesaid actuating means. In a Michelson-type interferometer, the reflecting surface may be a plane mirror in the optical path of fixed length. In an interferometer of the type using cat's-eye retroreflectors, the reflecting surface may be a beam splitter used for one side of each retroreflector, in a position nominally parallel to a beam combiner for the other side of the retroreflector, or vice verse.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 2 is a block diagram of the electronic system of the present invention.

FIG. 3 schematically illustrates in a plan view another type of interferometer embodying the present invention.

DESCRIPTION OF THE PREFERRED EMBODIMENTS

Figure 1:
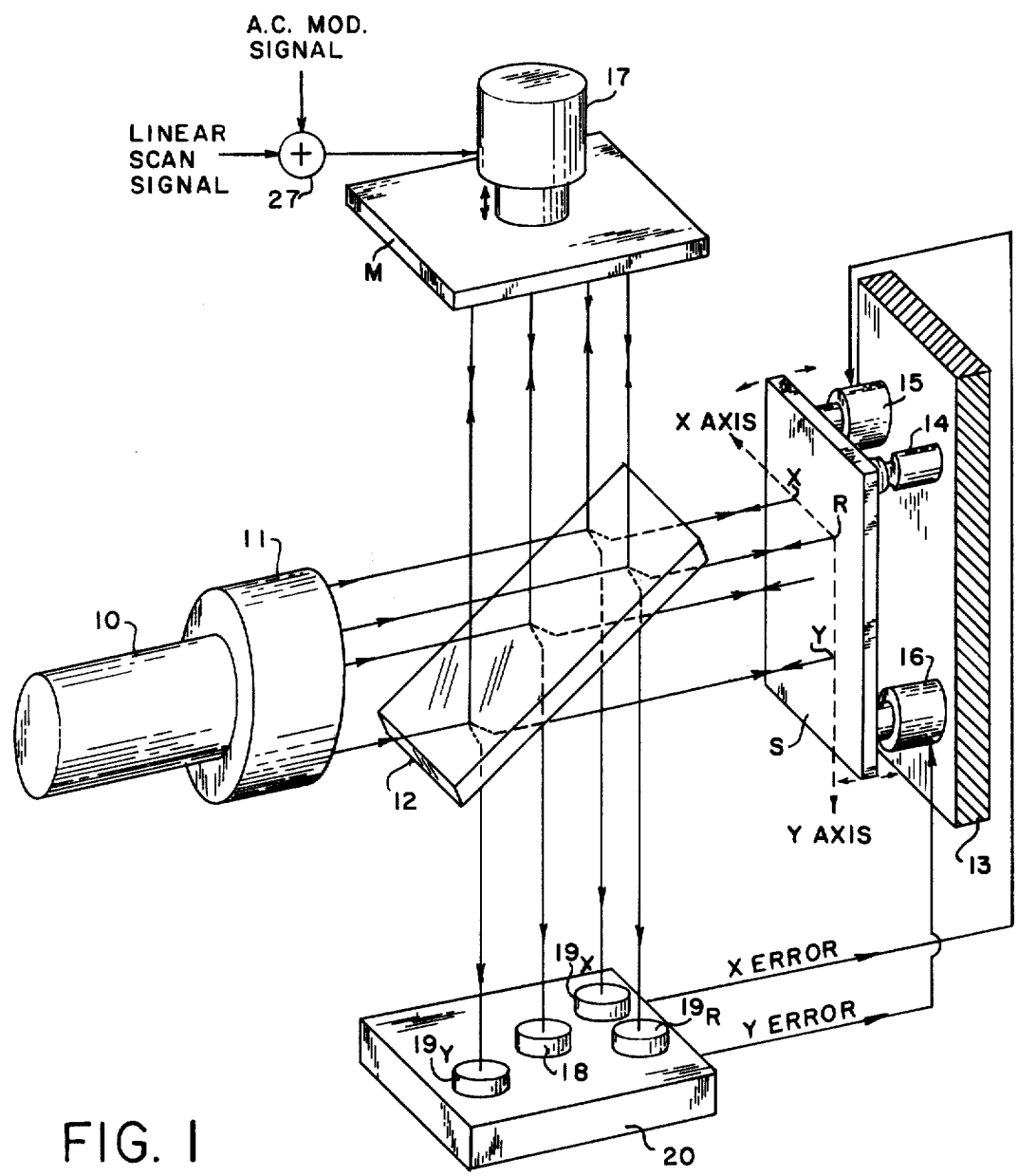
FIG. 1 schematically illustrates in a perspective view an embodiment of the present invention in a Michelson-type interferometer.

Referring to the drawings, FIG. 1 illustrates in a perspective view the optical configuration of a typical Michelson interferometer. A beam from a laser (He-Ne) 10 is expanded into a larger diameter, collimated beam by a lens system 11. After passing through the lens system, the beam is split by a beam splitter 12 which transmits half the beam to a slave mirror S, and reflects the other half of the beam to a master mirror M. The slave mirror is fixed in space relative to a support plate 13 by a post 14 having a ball and socket arrangement, or the like, for pivotally fastening its end to the back of the slave mirror. Two other corners of the slave mirror are pivotally fastened to the plate 13 by actuators 15 and 16.

The actuators 15 and 16 are disposed to connect to the slave mirror at points which are on orthogonal axes that pass through the point of connection of the post 14. For simplicity, it may be assumed that these points of connection for the post 14 and the actuators 15 and 16 are directly behind points R, X and Y on the face of the slave mirror, although it is sufficient for the reflecting points X and Y to be on mutually perpendicular X and Y axes passing through the reference point R, as shown.

Ideally, the master mirror is held in space by a linear motion actuator 17 such that at all times it is normal to the slave mirror, and at a 45° angle relative to the beam splitter. However, in practice there will be some tilting of the master mirror as it is actuated through its full range, typically of the order of several inches. This tilting will adversely affect the interference phase of light reflected from the center of the slave and master mirrors onto a data detector 18. It will likewise affect the interference phase of light reflected from the corners of the slave and master mirrors onto reference X and Y detectors $19_R$, $19_X$ and $19_Y$ disposed on the same plane as the data detector 18. That plane is normal to the nominal axis of the interferometer output beam, and the X and Y detectors are disposed on orthogonal axes passing through the reference detector.

The output of each of the detectors $19_R$, $19_X$ and $19_Y$ is applied to an actuator control section 20, shown in FIG. 2, which develops X and Y error signals applied to the X and Y actuators 15 and 16. The output of the data detector 18 is separately processed in a conventional manner by circuits not shown. The response of the actuators 15 and 16 to the X and Y error signals is such as to tilt the slave mirror in such a way as to compensate for any tilt in the interferometer beam received by the detector 18 from the master mirror, i.e., to maintain the slave mirror normal to the master mirror as the latter is moved by the linear actuator 17.

Referring now to FIG. 2, the X and Y detector outputs, which have a DC component, are separately amplified through amplifiers 21 and 22, and separately multiplied in analog multipliers 23 and 24 by the output of the reference detector shifted 90° spatially to produce linear X and Y error signals at the outputs of respective lowpass filters 25 and 26. The DC component of each detector, including a detector 19, is removed by a DC offset signal, Vo, at the differential input stage of its amplifier.

The spatial 90° phase shift may be obtained by optical means, such as by a quarter-wave plate in front of the reference point R on the above mirror, or by more complex optical systems involving polarizers, but it may also be done conveniently with electronic means in the following manner. First the linear motion actuator 17 driven by a linear scan signal is modulated by adding to the scan signal an AC modulating signal through an analog adder 27 (FIG. 1). The reference detector signal, amplified through an amplifier 28 (FIG. 2) is then demodulated in a phase sensitive demodulator 29, using the AC modulating signal as a reference. The result is a signal corresponding to the X and Y detector signals, but spatially offset 90°.

The X and Y error signals are applied to the respective actuators 15 and 16 for the X and Y axes, to tilt the slave mirror to a null position, i.e., to a position where the X and Y error signals are independently reduced to zero. Such a null position is thus maintained as the master mirror is moved to shorten, or lengthen, its optical path, even though the master mirror tilts as it is being moved. Consequently, the interference pattern of the reflected beams from the master and slave mirrors, detected by the data detector 18 as the master mirror is moved, is unaffected by any angular tilt of the master mirror while scanning.

The following analysis is presented to provide a better understanding of the invention. First it should be appreciated that the three phase dependent detectors, $19_X$, $19_Y$ and $19_R$, establish a plane. Letting $Z_r$ equal the reference optical path difference (retardation) and $Z_x$ equal the path difference for the X detector, the reference and X detector outputs are given by the following equations:

$$e_r = A_r \cos\left(\frac{2\pi Z_r}{\lambda} - 90°\right) \quad (1)$$

$$e_x = A_x \cos\left(\frac{2\pi Z_x}{\lambda}\right) \quad (2)$$

where $\lambda$ is the laser wavelength, and $A_r$ and $A_x$ are constants. Multiplying $e_x$ by $e_r$ in multiplier 23 yields the following:

$$e_{rx} = \frac{A_r A_x}{2} \cos\left(\frac{2\pi Z_r}{\lambda} - 90°\right)\cos\left(\frac{2\pi Z_x}{\lambda}\right)$$

$$= \frac{A_r A_x}{2} \sin\left(\frac{2\pi Z_r}{\lambda}\right)\cos\left(\frac{2\pi Z_x}{\lambda}\right)$$

$$= \frac{A_r A_x}{2} [\sin\frac{2\pi}{\lambda}(Z_r + Z_x) + \sin\frac{2\pi}{\lambda}(Z_r - Z_x)] \quad (3)$$

The second term, $\sin(2\pi/\lambda)(Z_r-Z_x)$, contains the significant phase error information. It is a measure of the retardation between the reference and the X detectors. If there is no angular tilt of the master mirror, $Z_r$ will equal $Z_x$ and that term will be zero. The sign of that term indicates the direction of the error. The first term depends upon the sum of the path differences, $Z_r+Z_x$, and since neither $Z_r$ nor $Z_x$ is being maintained constant, this first term can be filtered out by the lowpass filter 25. Analysis for the Y axis error is similar. The path difference $Z_y$ is substituted for $Z_x$ in equation (2) to obtain $e_y$, and the product $e_r e_y$ is obtained (from multiplier 24). Upon filtering the first term in filter 26, a Y-error signal is derived for the Y axis.

The foregoing principles of the invention are applicable in interferometers of other optical configurations. For example, in an interferometer shown in FIG. 3, two cat's-eye retroreflectors 31 and 32 receive monochromatic light from a laser 33. The light is first reflected by a stationary mirror 34 to an input beam splitter $S_1$ which partially reflects light to the retroreflector 31 and partially transmits light to the retroreflector 32. Stationary mirrors 35 and 36 are employed to fold the paths (arms) of the retroreflectors for convenient assembly in a package indicated by a dotted line 37. The output beams of the two arms are combined by an output beam combiner (beam splitter) $M_1$ which reflects light from the retroreflector 32, and transmits light from the retroreflector 31. The combined (interfering) beams are reflected by a mirror 38 to a data detector 18. The two beams thus combined at the mirror 38 must be parallel, just as the beams combined at the beam splitter of a Michelson-type interferometer must be parallel. Any deviation from that condition in this interferometer is detected in the same way as for the Michelson-type interferometer, and any error signal developed is applied to respective actuators 39 and 40. As before, the reference beam is spatially phase shifted 90° to provide a signal $e_r$. The outputs $e_x$ and $e_y$ of the detectors $18_x$ and $18_y$ are multiplied by $e_r$ to produce the respective X and Y error signals applied to the actuators 39 and 40 to so tilt the beam splitter $S_1$ as to compensate for any tilt of the retroreflector 31 as it is moved by a linear motion actuator 41 in response to a linear scan signal. That scan signal is modulated by an AC signal in an analog adder 42 for the spectral 90° phase shift. The actuator control section 20' is the same as is shown in FIG. 2 for the embodiment of FIG. 1.

Figure 4:
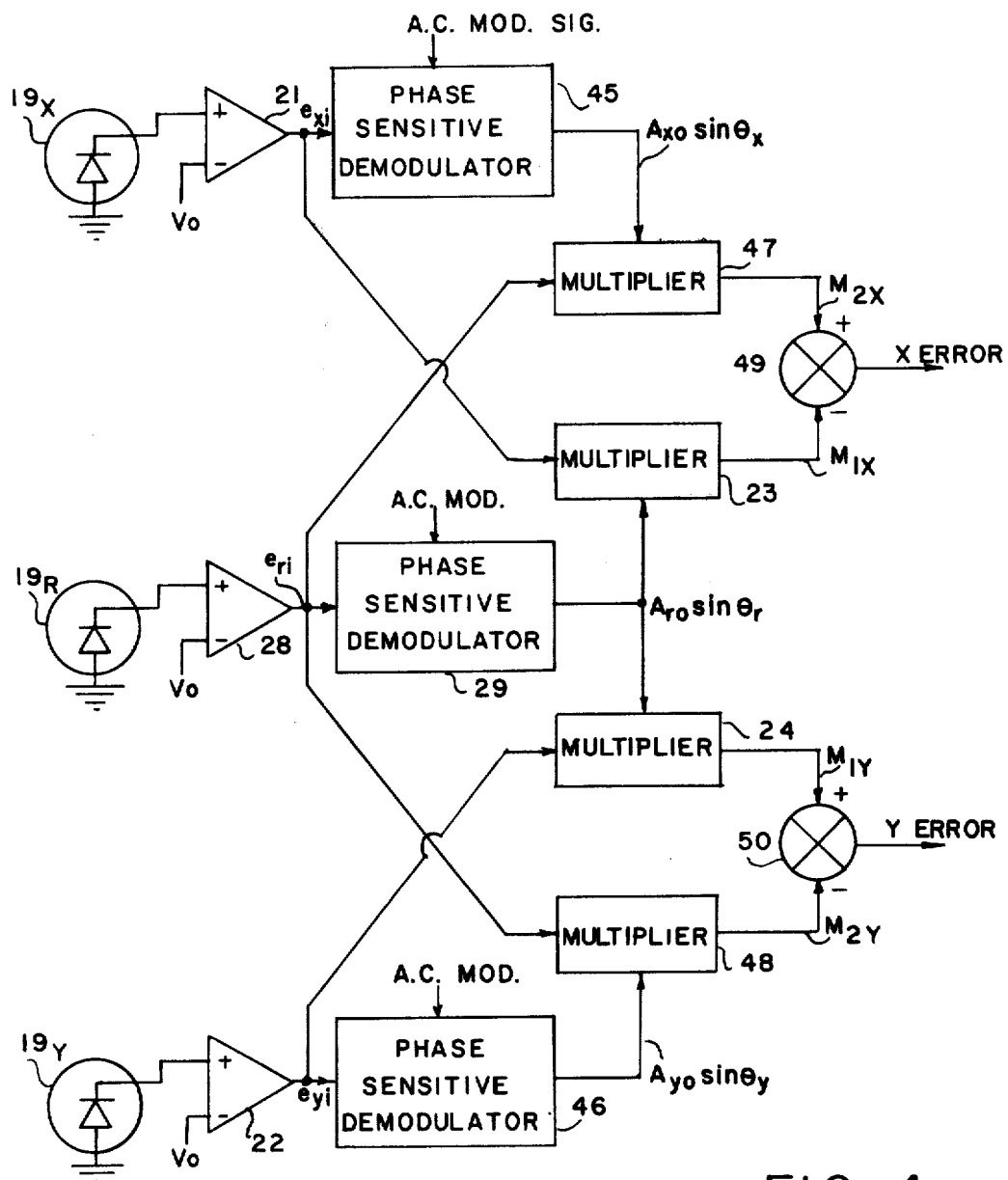
FIG. 4 is a block diagram of a modification of the electronic system of FIG. 2.

As noted hereinbefore with reference to Equation (3), the term containing the sum $Z_r + Z_x$ is required to be filtered out by lowpass filters. An improved technique for producing the error signal without that term is illustrated in FIG. 4 wherein the same reference numerals are used for the elements common to the system of FIG. 2. The technique is to include phase sensitive demodulators 45 and 46, and multiply the output of each demodulator with the signal $e_{ri}$ from the reference detector $19_R$ in respective multipliers 47 and 48 to form products $M_{2x}$ and $M_{2y}$ which are subtracted from the products formed by the multipliers 23 and 24, namely $M_{1x}$ and $M_{1y}$ to form the X and Y error signals, as shown via differencing circuits 49 and 50.

The following analysis is presented for the X error signal to provide a better understanding of the technique. The analysis for the Y error signal is strictly analogous. The outputs of the detector amplifiers 28 and 21 may be represented by the terms $A_{ri}\cos\theta_r$ and $A_{xi}\cos\theta_x$, and the outputs of the demodulators 29 and 45 by the terms $A_{ro}\sin\theta_r$ and $A_{xo}\sin\theta_x$, where the subscripts $r$ and $x$ identify the reference and X-axis detection channels, and the further subscripts $i$ and $o$ identify the input and outputs of the demodulators in the respective channels as to gain constants A of detector amplifiers 28 and 21. Cross multiplying the input of the demodulator in one channel with the output of the demodulator in the other channel yields the produces $M_{1x}$ and $M_{2x}$, and their sum, as follows:

$$M_{1x} = A_{ri}\cos\theta_r \cdot A_{xo}\sin\theta_x \quad (4)$$

$$M_{2x} = A_{ro}\sin\theta_r \cdot A_{xi}\cos\theta_x \quad (5)$$

$$M_{2x} - M_{1x} = A_{ro}A_{xo}\sin(\theta_r - \theta_x) \quad (6)$$

$$= A_{ro}A_{xo}\sin\frac{2\pi}{\lambda}(Z_r - Z_x);$$

where $A_{ri} = A_{ro} \cdot A_{xi}$

As before, the reference beam is spatially phase shifted 90° by modulating the linear scan signal with an AC modulating signal, and demodulating through the phase sensitive demodulator 29. The technique here is to also process the unmodulated signal in the X-axis detection channel through a phase sensitive demodulator. Upon cross multiplying and adding according to Equations (4), (5) and (6), the result is an X-error signal that includes only one term which is a function of the difference $(Z_r - Z_x)$, the significant phase error information. In that manner the term of Equation (3) that is a function of the sum $(Z_r + Z_x)$ is avoided in the result.

Although particular embodiments of the invention have been described and illustrated herein, it is recognized that modifications and variations may readily occur to those skilled in the art. It is therefore intended that the claims be interpreted to cover such modifications and variations.

I claim:

1. In an interferometer having two optical paths from a monochromatic source to a data detector and actuating means for varying the length of one of said optical paths, a servo system for so automatically adjusting the angular tilt of a reflecting planar surface in one of said paths as to maintain parallel the interfering beams of said two paths at the optical output of said interferometer, said reflecting planar surface having three points R, X and Y spaced apart on mutually perpendicular X and Y axes, said point R being at the intersection of said axes, and said points X and Y being on respective X and Y axes, the combination comprising three detectors near said optical output of said interferometer disposed on said X and Y axes as reflected to said optical output on a plane normal to the nominal beam axis at said optical output, one detector placed to receive light reflected from said point R of said reflecting surface, one of the other two detectors placed to receive light reflected from said point X of said reflecting surface and the third detector placed to receive light reflected from said point Y of said reflecting surface, means for producing a 90° phase shifted signal $e_r$ in response to light waves detected by said one detector from said point R, said signal $e_r$ being proportional to the optical path difference of light reflected from said point R, and separate means responsive to separate ones of said other two detectors for producing signals $e_x$ and $e_y$ proportional to the optical path differences of light reflected from said points X and Y, means responsive to an X error signal for tilting said X axis in said reflecting surface through an angle proportional to the amplitude of said X error signal, means responsive to a Y error signal for tilting said Y axis in said reflecting surface through an angle proportional to the amplitude of said Y error signal, means for multiplying said signal $e_x$ by said signal $e_r$ to obtain said X error signal, and means for multiplying said signal $e_y$ by said signal $e_r$ to obtain said X error signal.

2. A servo system as defined in claim 1 wherein said means for producing a 90° phase shifted signal is comprised of means for modulating the length of said one of said optical paths in response to an AC modulating signal, and phase sensitive demodulating means responsive to said AC modulating signal for demodulating the signal output of said one detector to produce said signal $e_r$, said combination further including lowpass filters for filtering residual AC components in said X and Y error signals resulting from modulation of the length of said one of said optical paths and demodulating only the signal output of said one detector.

3. The combination of claim 2 wherein said interferometer is of the Michelson-type and said reflecting surface is a plane mirror in an optical path of fixed length.

4. The combination of claim 2 wherein said interferometer is of the type employing cat's-eye retroreflectors and said one reflecting surface is on a selected one of an input beam splitter and an output beam combiner, said beam splitter being nominally parallel to said output beam combiner.

5. In an interferometer having two optical paths from a monochromatic source to a data detector and actuating means for varying the length of one of said optical paths, a servo system for so automatically adjusting the angular tilt of a reflecting planar surface in one of said paths as to maintain parallel the interfering beams of said two paths at the optical output of said interferometer, said reflecting planar surface having three points R, X and Y spaced apart on mutually perpendicular X and Y axes, said point R being at the intersection of said axes, and said points X and Y being on respective X and Y axes, the combination comprising three detectors near said optical output of said interferometer disposed on said X and Y axes as reflected to said optical output on a plane normal to the nominal beam axis at said optical output, one detector placed to receive light reflected from said point R of said reflecting surface, one of the other two detectors placed to receive light reflected from said point X of said reflecting surface and the third detector placed to receive light reflected from said point Y of said reflecting surface, means for producing a 90° phase shifted signal in response to light waves detected by said one detector from said point R comprised of means for modulating the length of said one of said optical paths in response to an AC modulating signal, and phase sensitive demodulating means responsive to said AC modulating signal for demodulating the signal output of said one detector to produce a demodulated reference detector signal, separate phase sensitive demodulating means responsive to said AC modulating signal for demodulating the signal outputs of said other two detectors to produce demodulated X and Y detector signals, separate means for multiplying the signal output of said one detector with demodulated X and Y detector signals to form respective product signals $M_{2x}$ and $M_{2y}$, separate means for multiplying the undemodulated signal outputs of said other detectors with said demodulated reference detector signal to form respective product signals $M_{1x}$ and $M_{1y}$, means for forming an X error signal as the difference between said signal $M_{2x}$ and said signal $M_{1x}$, means for forming a Y error signal as the difference between said signal $M_{2y}$ and said signal $M_{1y}$, means responsive to said X error signal fr tilting said X axis in said reflecting surface through an angle proportional to the amplitude of said X error signal, and means responsive to said Y error signal for tilting said Y axis in said reflecting surface through an angle proportional to the amplitude of said Y error signal.

6. The combination of claim 5 wherein said interferometer is of the Michelson-type and said reflecting surface is a plane mirror in an optical path of fixed length.

7. The combination of claim 5 wherein said interferometer is of the type employing cat's-eye retroreflectors and said one reflecting surface is on a selected one of an input beam splitter and an output beam combiner, said beam splitter being nominally parallel to said output beam combiner.

* * * * *